(12) United States Patent
Chamarajanagar et al.

(10) Patent No.: US 7,885,180 B2
(45) Date of Patent: Feb. 8, 2011

(54) ADDRESS RESOLUTION REQUEST MIRRORING

(75) Inventors: Raveendra Chamarajanagar, Mountain View, CA (US); Peter Hunt, Sunnyvale, CA (US); Scott Kimble, Sunnyvale, CA (US); Tuyen Nguyen, San Ramon, CA (US)

(73) Assignee: Check Point Software Technologies Inc., Redwood City, CA (US)

( * ) Notice: Subject to any disclaimer, the term of this patent is extended or adjusted under 35 U.S.C. 154(b) by 929 days.

(21) Appl. No.: 11/639,423

(22) Filed: Dec. 15, 2006

(65) Prior Publication Data

US 2008/0144532 A1 Jun. 19, 2008

(51) Int. Cl.
*G06F 11/00* (2006.01)
(52) U.S. Cl. .................. 370/219; 370/389; 370/400
(58) Field of Classification Search ............... 370/216, 370/217, 218, 219, 220, 221, 222, 223, 224, 370/389, 390, 400, 401
See application file for complete search history.

(56) References Cited

U.S. PATENT DOCUMENTS

| | | | |
|---|---|---|---|
| 6,128,294 A * | 10/2000 | Oura et al. .................. 370/389 |
| 6,202,169 B1 | 3/2001 | Razzaghe-Ashrafi et al. |
| 6,516,000 B1 * | 2/2003 | Kshirsagar et al. .......... 370/410 |
| 6,618,377 B1 | 9/2003 | Miriyala |
| 7,152,179 B1 * | 12/2006 | Critchfield .................... 714/4 |
| 7,159,035 B2 * | 1/2007 | Garcia-Luna-Aceves et al. .......................... 709/241 |
| 7,463,579 B2 * | 12/2008 | Lapuh et al. ................. 370/216 |
| 7,474,660 B1 * | 1/2009 | Pearce et al. .............. 370/395.3 |
| 7,486,611 B1 * | 2/2009 | Wilson ........................ 370/220 |
| 7,693,045 B2 * | 4/2010 | McGee et al. ................ 370/216 |
| 2003/0037167 A1 * | 2/2003 | Garcia-Luna-Aceves et al. .......................... 709/238 |
| 2004/0008682 A1 * | 1/2004 | Miriyala ................... 370/395.1 |
| 2005/0025179 A1 * | 2/2005 | McLaggan et al. .......... 370/468 |
| 2006/0143309 A1 | 6/2006 | McGee et al. ............... 709/250 |
| 2007/0101429 A1 * | 5/2007 | Wakumoto et al. ............ 726/23 |
| 2007/0183314 A1 * | 8/2007 | Li et al. ....................... 370/217 |
| 2008/0060073 A1 * | 3/2008 | Haeffele et al. ............... 726/23 |
| 2008/0259938 A1 * | 10/2008 | Keene et al. ................. 370/400 |

FOREIGN PATENT DOCUMENTS

EP 1 482 708 A2 12/2004

OTHER PUBLICATIONS

International Search Report PCT/IB2007/003484 dated Sep. 19, 2008.

* cited by examiner

*Primary Examiner*—Chi H. Pham
*Assistant Examiner*—Kevin Mew
(74) *Attorney, Agent, or Firm*—Squire, Sanders & Dempsey, LLP (57) ABSTRACT

Address Resolution Protocol (ARP) request mirroring can provide a mechanism for synchronizing link-layer adjacency information among network elements. This application can be useful, for example, for internet protocol (IP) routing network elements in a high-availability configuration.

40 Claims, 4 Drawing Sheets

ADDRESS RESOLUTION REQUEST MIRRORING

BACKGROUND OF THE INVENTION

1. Field of the Invention

Address Resolution Protocol (ARP) request mirroring can provide a mechanism for synchronizing link-layer adjacency information among network elements. This application can be useful, for example, for internet protocol (IP) routing network elements in a high-availability configuration.

ARP request mirroring can provide a mechanism that enables highly available nodes in standby mode to monitor an ARP request sent from the active node to resolve a peer link address. The standby node can then issue its own ARP request to the target network address to resolve the peer link address.

2. Description of the Related Art

In a typical network, a network element needs link-layer adjacency information to communicate with its neighbors over a broadcast medium. For example, a network element on an Ethernet network must learn its neighbor's media access control (MAC) address to send data to it. Network elements can use an Address Resolution Protocol (ARP) to obtain a neighbor's link-layer address from its network-layer address. The network element that desires information about its neighbor can broadcast an ARP request message. The broadcast ARP request message can contain the neighbor's network address and its own network-layer and link-layer addresses, to all adjacent network elements. The neighbor with the corresponding network address can send an ARP reply message, containing its link-layer address, back to the requestor. The requestor can store the information in an ARP cache. The neighbor may optionally store the requestor's network-layer and link-layer addresses from the request in its own cache, for later use.

Thus, a network element can obtain adjacency information about its neighbor via the ARP protocol in at least two ways:

1) it can receive an ARP request for one of its network addresses from the neighbor. The network element may then add an ARP entry from the neighbor's address information in the request; or 2) it can broadcast an ARP request for the neighbor's network address and receive a reply containing the neighbor's link address.

ARP is currently used by all kinds of network elements, including (but not limited to) servers, routers, network attached storage, security appliances, and the like. The invention described below, thus, can be used in any network environment where ARP is used. Further details about an ARP protocol can be found in "An Ethernet Address Resolution Protocol," David C. Plummer, RFC 826, November 1982.

Address Resolution Protocol is the name of an Internet Engineering Task Force (IETF) standard that provides an address resolution protocol, and which is described in RFC-826. Address Resolution Protocol enables a network element to determine the link-layer address of a link adjacent network element when only the network address is known.

The network address is typically internet protocol (IP). The Internet Protocol is an IETF standard that provides an internet protocol and has two significant versions, IPv4 and IPv6. The latest IPv4 is described in RFC-791. The latest IPv6 is described in RFC-2460. Internet Protocol is a network layer protocol that provides globally unique addressing across physical networks. An Internet Protocol Address is globally unique address that is used to identify network elements on different networks. The Internet Protocol address format is dependent on the Internet Protocol version.

The link address is typically Ethernet. Ethernet is an Institute of Electrical and Electronics Engineers (IEEE) standard and is described in IEEE 802.3. Ethernet is a frame based network protocol for local area networks and provides a means of uniquely addressing stations on the local area network. An Ethernet address can also be referred to as a Media Access Control (MAC) address. An Ethernet address is globally unique and used to address stations on the same physical network.

A cluster of elements can be used in certain circumstances. A cluster is one or more elements working together, often to provide load balancing and/or high availability of a service. Proxy ARP is a method in which one network element responds to ARP request on behalf of another network element. It is typically used by bridges and gateways to route between networks on different networks without the need for a routing protocol. The Virtual Router Redundancy Protocol is an IETF standard and defined in RFC-3768. Virtual Router Redundancy Protocol provides increased availability of network elements that serve as default routers for networks. The protocol defines an election process by which these elements select an active node to provide the next hop service. All other participating elements are standby nodes. Should the active node fail, the standby nodes will elect a new active node.

High Availability (HA) is a method to increase the ability of a service to withstand failure. HA can be deployed as a set of redundant service nodes. There are many approaches to HA configurations. One example of HA is Active-Standby. Active-Standby illustrates the mechanics of HA, but is not the only implementation. In Active-Standby, one of the service nodes can be active and provide the service. The remaining service nodes can be standby nodes ready to assume the active role should the active node fail. When the active node fails, the standby node can be expected to take over as quickly and completely as possible to minimize disruption of the service. This situation is referred to as a failover.

The phrase "failed active node" is used to designate an active node that has failed. The phrase "newly active node" is used to designate a standby node that has transitioned to active node.

An optimal failover occurs when the active node and the standby node have the same set of information. However, link-layer adjacency information tends to differ between active and standby nodes; link-layer adjacency information is acquired on an as-needed basis, and standby nodes tend not to communicate with neighbors.

As noted above, network elements can use ARP to obtain a neighbor's link-layer address from its network-layer address. The inventors have recognized that, at present, ARP does not provide a mechanism to distribute learned link-layer adjacency. When an active node in a highly available configuration fails, the link-layer adjacency it learned is lost. Before a newly active node can provide the same level of service as the failed active node, it can be required to learn the same set of link-layer adjacencies as the failed active node had.

The present inventors have recognized that this learning process can lead to a service delay until the newly active node regains that information. Additionally, the network can be burdened by a flurry of ARP request/reply transactions while the newly active node repopulates its ARP cache.

The present inventors have also recognized that a similar issue exists in an active-active high availability configuration, in which the nodes are communicating with different neighbors, and therefore have different ARP cache contents. If one node fails, the node that assumes its share of the network service burden must reacquire the failed node's link-layer adjacency information. Such a node is thus functionally equivalent to a "standby node" in the active/standby configuration.

SUMMARY OF THE INVENTION

One embodiment of the present invention is a method. The method includes receiving an address resolution request from an active node. The method further includes transmitting a second request mirroring the request when the request meets a predetermined condition. The method also includes updating an address resolution cache based on information in the request and the reply to the mirrored request. The method additionally includes assuming responsibilities of the active node when the active node fails.

Another embodiment of the present invention can be a network element. The network element includes reception means for receiving an address resolution request from an active node. The network element also includes transmit means for transmitting a second request when the request meets a predetermined condition. The predetermined condition can include at least one of when the request originates from the active node or when the request seeks information that is unknown to the network element. The network element also includes update means for updating storage means for storing address resolution information based on information in the request and the reply to the mirrored request. The network element additionally includes processor means for assuming responsibilities of the active node when the active node fails.

A further embodiment of the present invention can also be a network element. The network element includes a processor and a cache. The processor is configured to receive an address resolution request from an active node. The processor is also configured to transmit a second request mirroring the request when the request meets a predetermined condition. The predetermined condition can include at least one of when the request originates from the active node or when the request seeks information that is unknown to the network element. The processor is configured to update the cache based on information in the request and the reply to the mirrored request. The processor is also configured to assume responsibilities of the active node when the active node fails.

Another embodiment of the present invention is a system. The system includes an active node, a standby node, and a plurality of neighbor nodes to the active node. The standby node is configured to mirror the address resolution requests of the active node, when the address resolution requests of the active node request information about at least one of the neighbor nodes, and the information is not already present in a cache of the standby node.

A further embodiment of the present invention is a computer program embodied on a computer readable medium, encoding instructions that are configured to cause a hardware device to perform a method. The method includes receiving an address resolution request from an active node. The method further includes transmitting a second request mirroring the request when the request meets a predetermined condition. The method also includes updating an address resolution cache based on information in the request and the reply to the mirrored request. The method additionally includes assuming responsibilities of the active node when the active node fails.

BRIEF DESCRIPTION OF THE DRAWINGS

For proper understanding of the invention, reference should be made to the accompanying drawings, wherein.

DETAILED DESCRIPTION OF THE PREFERRED EMBODIMENTS

As mentioned above, there are two typical methods by which a node can use Address Resolution Protocol (ARP) to learn peer network address to peer link address mappings— by receiving ARP requests for its addresses from neighbors, or by sending ARP requests to neighbors. In a high availability configuration, a standby node can acquire the active node's adjacency information using a passive ARP learning technique (such as is disclosed in the concurrently filed application, titled "Selective Passive Address Resolution Learning," which is not prior art), but this may only yield information the active node learned through the first method. ARP Request mirroring, as described in more detail below, can enable a standby node to acquire adjacency information that the active node learns through the second method—i.e. information the active node requests itself.

Certain embodiments of the present invention enable ARP cache synchronization when the active node issues the initial ARP request. Thus, certain embodiments of the present invention can constitute a modification to the ARP requests processing of the standby node, with a filter list containing a set of match rules for sender network addresses and/or sender link addresses. When the standby node receives an ARP request message, it can match the sender network address and/or sender link address in the message against the rules in the filter list. If a rule matches, the network node can search its own ARP cache for an entry matching the target network address in the request. If it has no ARP entry in its cache, the node can send its own ARP request to the target network address and it can create an entry in the ARP cache with the target network address and mark the entry as unresolved.

When the standby node receives an ARP reply to the ARP request it sent, then it can create an entry in the ARP cache with the sender network address and sender link address contained in the ARP reply. Alternatively, the standby node can update the entry in the ARP cache for the sender network address with the sender link address contained in the ARP reply and mark the entry as resolved.

Certain embodiments of the present invention can provide value to highly available systems that rely on minimal service disruption when an active node fails and a standby node transitions to active node. Further, the present invention can be implemented without requiring changes to the existing address resolution protocol.

Certain embodiments of the present invention can provide ARP cache synchronization between active node and standby nodes for a select set of network and/or link addresses. Because the ARP caches can be synchronized, the network can avoid being loaded with ARP request/reply transactions that would be required for the newly active node to learn the link-layer adjacency of peer nodes. Thus, certain embodiments of the present invention can enable the newly active node to operate at capacity without delay.

Certain embodiments of the present invention can be selective, thereby reducing the set of ARP cache entries learned to the set of network and/or link addresses specified in the match rules.

Because no change to the ARP protocol may be required, operators can upgrade their standby node and obtain full benefit after one ARP life cycle. In environments configured with an active node that never operates as a standby node, the active node does not need to implement ARP request mirroring. Typically, however, HA nodes run the same set of software.

Although certain embodiments of the present invention may require the standby node to consume additional system resources to learn link-layer adjacency of peer nodes by sending an ARP request that it otherwise would not send, this should be a minimal burden to the standby node. In other words, even in embodiments in which ARP request mirroring requires each standby node to send an ARP request to for each ARP request sent by the active node, the burden should not be severe. Furthermore, such ARP request mirroring can permit the requests to be distributed over time, rather than being all at once when the active node fails.

As noted above, when the standby node receives an ARP request message, it can match the sender network address and/or the sender link address in the message against the rules in the filter list. Certain embodiments of the present invention can, thus, enable a highly available node operating in standby mode to learn the same set of link-layer adjacency as the active node. Should the active node fail, such a standby node would not be delayed in providing service, since it already has the link-layer adjacency of all peers receiving service from the now failed active node.

As described above, there are two methods by which a node can use ARP to learn peer network address to peer link address mappings—by receiving ARP requests for its addresses from neighbors, or by sending ARP requests to neighbors.

In a high availability configuration, a standby node can acquire the active node's adjacency information using a passive ARP learning technique (as described in the concurrently filed application mentioned above), and such a technique may yield information the active node learned through the first method.

ARP request mirroring can enable a standby node to acquire adjacency information that the active node learns through the second method by requesting information itself.

Certain embodiments of the invention, therefore, may be particularly useful for, but not limited to, network routing elements in a high availability configuration.

Figure 1:
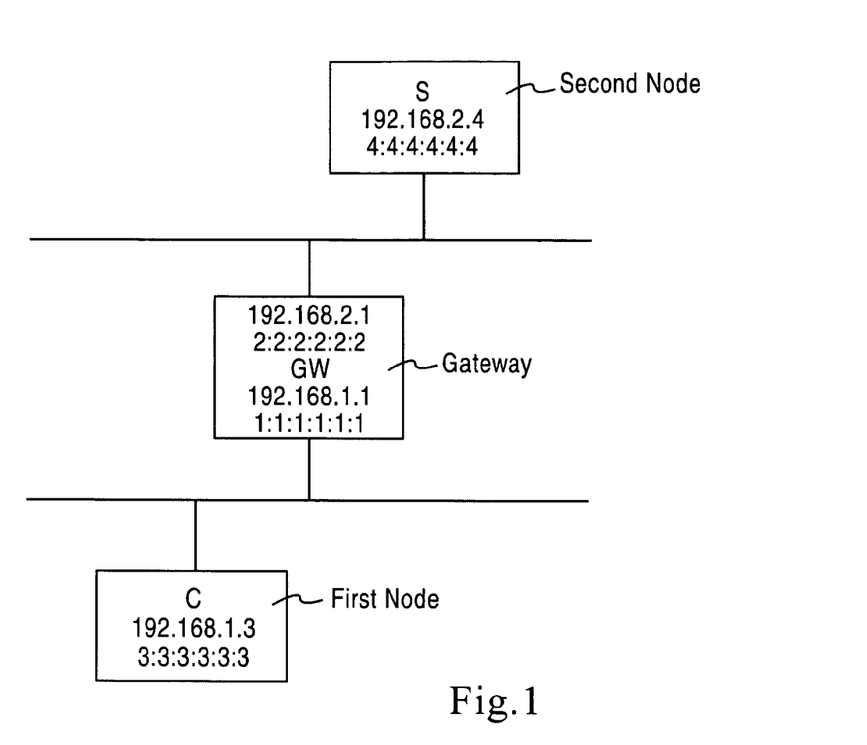
FIG. 1 illustrates an infrastructure of an example network to which the present invention may be applied.

Refer to FIG. 1 for the following illustrative example. Suppose that a first node C wants to send a service request to a second node S that requires a service reply. Additionally, C has a default route configured to gateway (GW) address 192.168.1.1. Similarly, S has a default route configured to GW address 192.168.2.1. GW may be considered as an active node, in terms of the discussion above. An example of the first method of learning is as follows.

First C broadcasts an ARP request with the following characteristics,
sender link address: 3:3:3:3:3:3
sender network address: 192.168.1.3
target link address: 0:0:0:0:0:0
target network address: 192.168.1.1
GW will create an ARP cache entry mapping the network address 192.168.1.3 to the link address 3:3:3:3:3:3. Additionally, GW will transmit an ARP reply with the following characteristics,
sender link address: 1:1:1:1:1:1
sender network address: 192.168.1.1
target link address: 3:3:3:3:3:3
target network address: 192.168.1.3
Now C will create an ARP cache entry mapping the network address 192.168.1.1 to the link address 1:1:1:1:1:1. C can now forward the service request to GW.

Now that GW has the service request, it can learn the link address of the service provider S so as to be able to forward the service request. This is an example of the second method.

First GW broadcasts an ARP request with the following characteristics,
sender link address: 2:2:2:2:2:2
sender network address: 192.168.2.1
target link address: 0:0:0:0:0:0
target network address: 192.168.2.4
S will create an ARP cache entry mapping the network address 192.168.2.1 to the link address 2:2:2:2:2:2. Additionally, S will transmit an ARP reply with the following characteristics,
sender link address: 4:4:4:4:4:4
sender network address: 192.168.2.4
target link address: 2:2:2:2:2:2
target network address: 192.168.2.1
Now GW will create an ARP cache entry mapping the network address 192.168.2.4 to the link address 4:4:4:4:4:4. GW can now forward the service request to S.

At this point S can send a service reply. There may be no need for additional ARP exchanges since all of the link adjacencies were learned during the service request operation.

Figure 2:
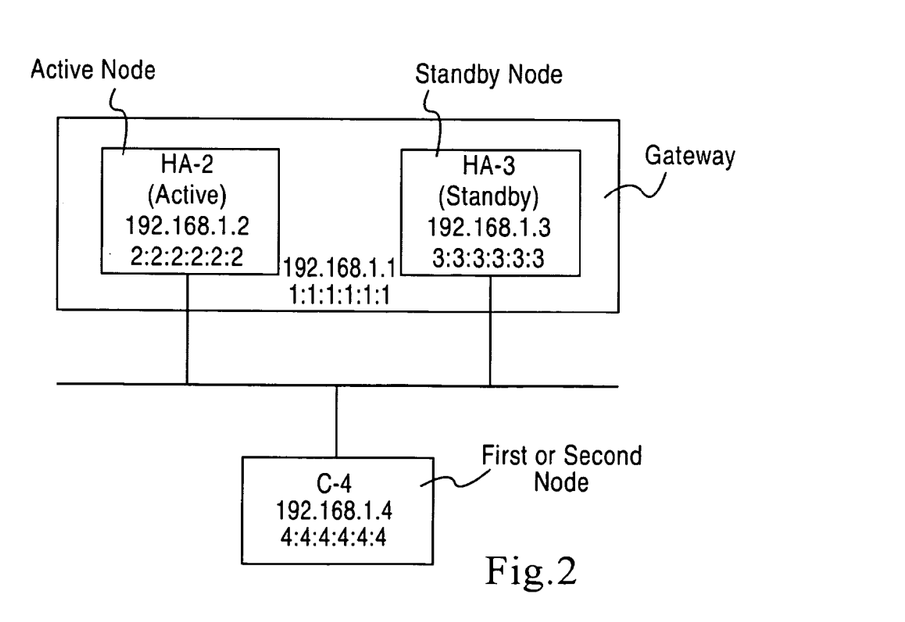
FIG. 2 illustrates the infrastructure of a high availability configured gateway to which the present invention may be applied.

As shown in FIG. 2, when GW is implemented as two nodes (an active node HA-2 and a standby node HA-3), and the active node HA-2 fails, the standby node HA-3 would have to learn link adjacencies for both C and S (which may be viewed as corresponding to C-4 in FIG. 2) before it provide the same level of service as the active node. Passive ARP learning could enable the standby node to learn the link-layer adjacency of C, using the first method illustrated above. ARP request mirroring, could enable the standby node to learn the link-layer adjacency of S, using the second method illustrated above. The techniques can be combined to provide complete ARP cache synchronization between an active node HA-2 and standby node HA-3.

Certain embodiments of the present invention, therefore, can enable ARP cache synchronization when the active node issues the initial ARP request. This can be achieved by a modification to the ARP requests processing of the standby node, with a filter list containing a set of match rules for sender network addresses and/or sender link addresses.

The syntax and form of the match rules can depend on the network and link address formats. When the network address is internet protocol (IP), the match rules may select by network prefix. When the link address is Ethernet, the match rules select by exact match or any match. Typically, rules can match an entire network or link address, but a rule may contain a prefix, a range, a sequence of individual addresses, or any criteria to match one or more network or link addresses.

Certain embodiments of the present invention can provide value to highly available systems that rely on minimal service disruption when an active node fails and a standby node transitions to active node. Examples of places in which such embodiments could be used include, but are not limited to, network clusters and virtual router redundancy protocol (VRRP) routers.

Certain embodiments of the present invention may include a configurable filter that enables software modules to specify a set of network and/or link addresses that the ARP engine should monitor.

ARP requests can be sent to a broadcast address, so that all adjacent nodes receive them. However, adjacent nodes will normally discard them unless the target address matches one of their network addresses on the network. The rules for treating these messages may be modified such that a standby node does not discard the request but processes the message against a set of rules. In addition to conventional ARP request processing, the standby node can attempt to match the source network address and/or source link address against rules in its filter list.

Methods of matching the source address(es) against the rules can depend on the network address and link address format and the semantics of the rule. The rule contents may include, but are not be limited to, a single address, an address range, a prefix or bit mask, a sequence of addresses, or any criteria to match one or more network or link addresses.

An implementation may set or change the ordering of the filter rules according to, for example, priority, specificity, or heuristics that improve performance. However, the present invention does not require the rules to have any ordering semantics.

When an ARP request arrives and the sender network and/or sender link address matches a filter rule, the node may first verify that it does not already have an ARP entry for the target network address in the ARP request. If it does not have an entry for the target network address, it can create and send its own ARP request for the target address. The standby node then treats the corresponding ARP reply from the neighbor as defined by the appropriate ARP protocol.

In an HA configuration, the filter can, but is not required to, contain rules which match a set of virtual network addresses shared by highly available nodes. The active node can use virtual network addresses to communicate to its neighbors and to systems on other networks. By adding the virtual addresses as exact match filter rules on the standby node implementing this invention, the standby node can send an ARP request for any target the active node sends a request for, provided the active node sources its requests from the virtual address.

Figure 3:
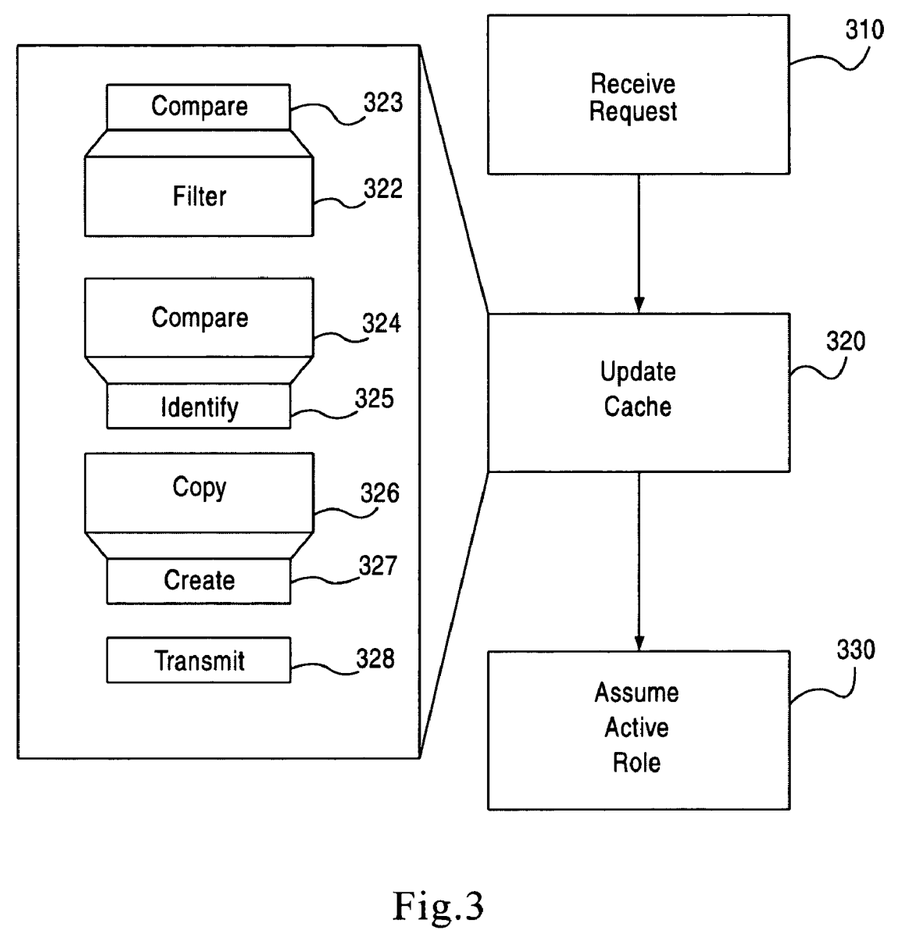
FIG. 3 illustrates a method according to one embodiment of the present invention.

FIG. 3 illustrates a method according to one embodiment of the present invention. In the method, a standby node can receive 310 a request. The request can be an address resolution request, and can be in address resolution protocol form. The request can be a broadcast request. The request can be received from an active node, and can in certain instances, be received directly from the active node.

After the request is received 310, the standby node can update 320 a cache. Updating 310 the cache can include filtering 322 the request. Filtering 322 the request can include comparing 323 the request to a filter list containing a set of match rules for at least one of sender network addresses or sender link addresses.

Updating 310 the cache can additionally include transmitting 328 a second request mirroring the request when the request meets a predetermined condition. The predetermined condition can be, for example, when the request originates from the active node, when the request seeks information that is unknown to the standby node, or both.

The updating 310 the cache can also include comparing 324 information in a response to the second request to information in the cache. The comparing 324 can include identifying 325 whether the information in the response is already in the cache.

The updating 310 can further include copying 326 previously unknown information from the response into the cache. The copying 326 can include creating 327 an entry in a table of the cache.

Once the cache is updated 320, the standby node can assume 330 the responsibilities of the active node. The standby node can assume 330 the responsibilities of the active node by performing a failover to become the active node. The standby node can, for example, assume 330 the responsibilities of the active node when the active node fails and the standby node becomes the newly active node.

Figure 4A:
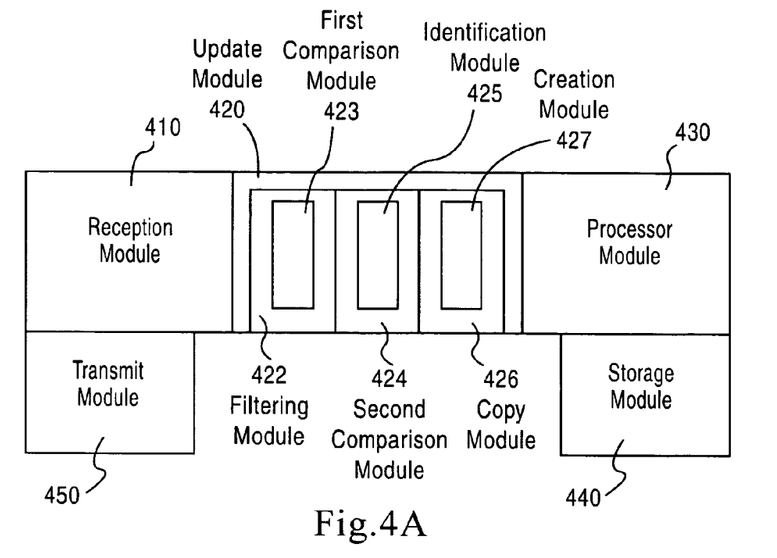
FIG. 4A illustrates a network element according to an embodiment of the present invention.

FIG. 4A illustrates a network element according to an embodiment of the present invention. The network element includes a reception module 410 for receiving an address resolution request from an active node. The network element also includes an update module 420 for updating a storage module 440 for storing address resolution information based on information in the request. The network element further includes a processor module 430 for assuming responsibilities of the active node when the active node fails. The network element also includes a transmit module 450 for mirroring the request with a second request when the request meets a predetermined condition. The predetermined condition can be determined to exist when, for example, the request originates from the active node, the request seeks information that is unknown to the network element, or both.

The various modules can be implemented in software, hardware, or a combination thereof. Any software can be implemented on or with underlying hardware that is configured to be responsive to the software instructions and to perform the functions called for by the software. The hardware can, for example, be a general purpose computer, or an application specific integrated circuit. The network element itself can be implemented in hardware alone, or hardware combined with software. The storage module 440 may be a cache, and may implemented by a computer-readable medium including, for example, a random access memory, a hard disk, a flash disk, or a memory stick.

The reception module 410 can be configured to receive a broadcast address resolution request. The reception module 410 can also be configured to receive an address resolution protocol formatted request. The reception module 410 can additionally be configured to receive the address resolution request directly from the active node. The reception module 410 can be further configured to receive a response to the second request.

The update module 420 can include a filtering module 422 for filtering the request. The filtering module 422 can include a first comparison module 423 for comparing the request to a filter list containing a set of match rules for at least one of sender network addresses or sender link addresses. The update module 422 can also include a second comparison module 424 for comparing information in the response to information in the storage module 440. The second comparison module 424 can include an identification module 425 for identifying whether the information in the response is already in the storage module 440. The update module 420 can include a copy module 426 for copying previously unknown information from the response into the storage module 440. The copy module 426 can include a creation module 427 for creating an entry in a table of the storage module 440.

The processor module 430 can be configured to assume the responsibilities of the active node by performing a failover to become the active node. The processor module 430 can, for example, assume the responsibilities of the active node when the active node fails and the processor module 430 becomes the newly active node.

Figure 4B:
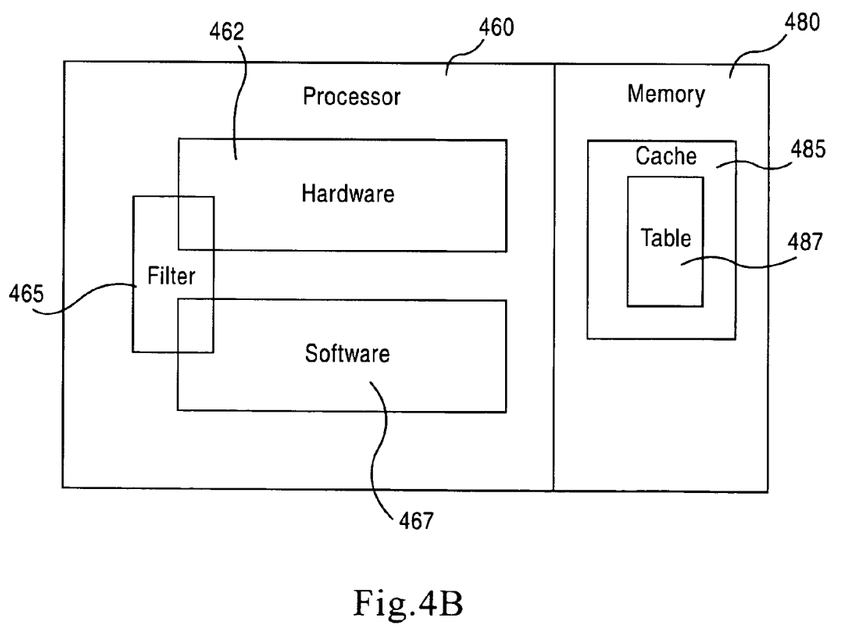
FIG. 4B illustrates another network element according another embodiment of the present invention.

FIG. 4B illustrates another network element according another embodiment of the present invention. The network element includes a processor 460 and memory 480. The memory 480 can include instructions for the processor, as well as various caches. The memory 480 can be implemented as a single memory unit, such as a disk drive, or may be implemented by multiple memory units such as various memory chips, and may be logically organized as a single or multiple memory elements. Memory 480 may include a cache 485, which may include a table 487.

Processor 460 may include both hardware 462 and software 467. Processor 460 may also include a filter 465 implemented in hardware 463 and/or software 467. The filter 465 may be configured to filter the request by comparing the request to a filter list containing a set of match rules for at least one of sender network addresses or sender link addresses.

The processor 460 may be configured to receive an address resolution request from an active node. The processor 460 may also be configured to transmit a second request mirroring the request when the request meets a predetermined condition. The predetermined condition can be met, for example, when the request was sent by the active node, when the request seeks information that is not found in the cache of the network element, or both.

The processor 460 may be configured to update the cache based on information in the request. The processor 460 may also be configured to assume responsibilities of the active node when the active node fails.

The processor 460 can also be configured to receive a broadcast address resolution request. The processor 460 can further be configured to receive an address resolution protocol formatted request. The processor 460 can additionally be configured to receive the address resolution request directly from the active node.

The processor 460 can be configured to compare information in the response to information in the cache. The processor 460 can also be configured to compare the information in the response by identifying whether the information in the response is already in the cache. The processor 460 can further be configured to copy previously unknown information from the response into the cache. The processor 460 can also be configured to copy the previously unknown information into the cache by creating an entry in a table of the cache.

The processor 460 can be configured to assume the responsibilities of the active node by performing a failover to make the network element become the active node. The processor 460 can, for example, assume the responsibilities of the active node when the active node fails and the processor 460 becomes the newly active node.

Figure 5:
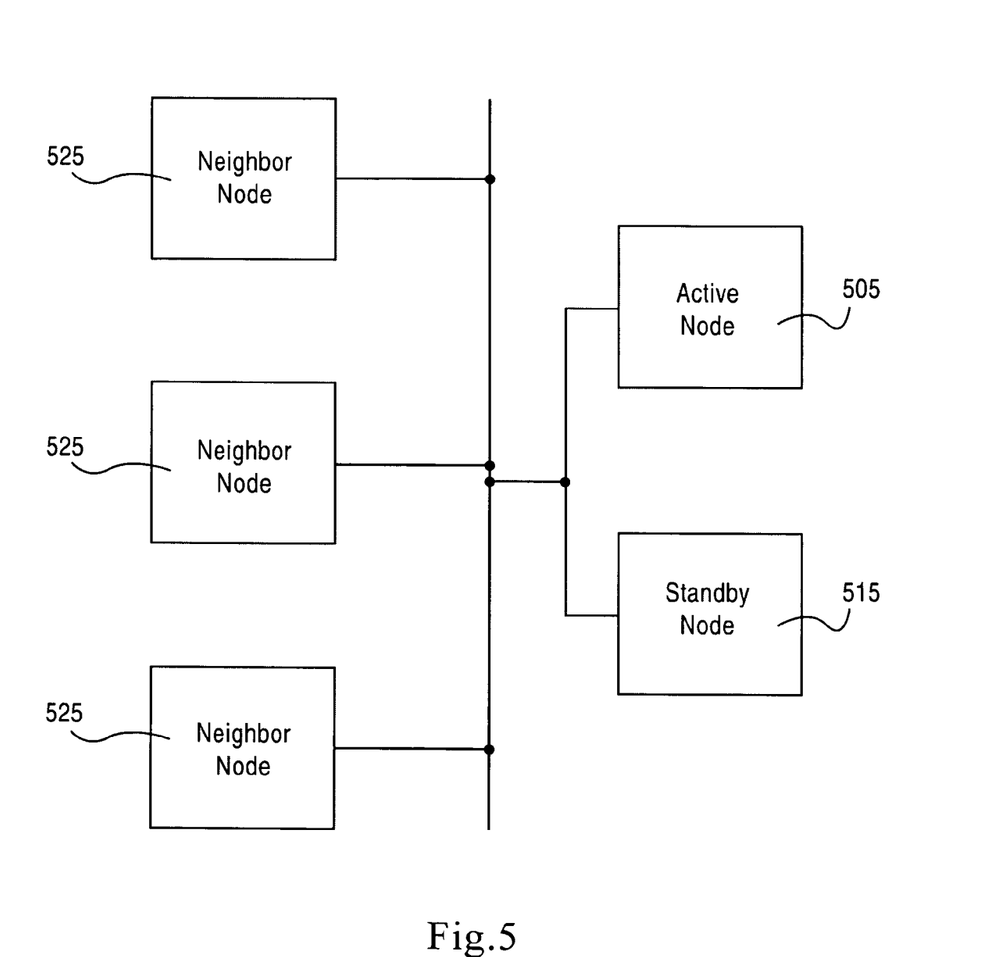
FIG. 5 illustrates a system according to an embodiment of the present application.

FIG. 5 illustrates a system according to an embodiment of the present application. The system can include an active node 505, a standby node 515, and a plurality of neighbor nodes 525 to the active node 505. The standby node 515 can be configured to mirror the address resolution requests of the active node 505, when the address resolution requests of the active node 505 request information about at least one of the neighbor nodes 525, and the information is not already present in a cache of the standby node 515. The various nodes may be connected by a network, and the standby node 515 and the active node 505 may be configured as a cluster.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What we claim is:

1. A method, comprising:
   receiving an address resolution request from an active node;
   transmitting a second request mirroring the request when the request meets a predetermined condition;
   updating an address resolution cache based on information in the request; and
   assuming responsibilities of the active node when the active node fails.

2. The method of claim 1, wherein the receiving the address resolution request comprises receiving a broadcast address resolution request.

3. The method of claim 1, wherein the receiving the address resolution request comprises receiving an address resolution protocol formatted request.

4. The method of claim 1, wherein the receiving the address resolution request comprises receiving the address resolution request directly from the active node.

5. The method of claim 1, wherein the updating the cache comprises filtering the request.

6. The method of claim 5, wherein the filtering the request comprises comparing the request to a filter list containing a set of match rules for at least one of sender network addresses or sender link addresses.

7. The method of claim 1, wherein the updating the cache comprises comparing information in the response to information in the cache.

8. The method of claim 7, wherein the comparing the information in the response comprises identifying whether the information in the response is already in the cache.

9. The method of claim 1, wherein the updating the cache comprises copying previously unknown information from the response into the cache.

10. The method of claim 9, wherein the copying the previously unknown information into the cache comprises creating an entry in a table of the cache.

11. The method of claim 9, wherein the copying the previously unknown information into the cache comprises mapping a network address to a link address.

12. The method of claim 1, wherein the assuming the responsibilities of the active node comprises detecting the failure of the active node and becoming a newly active node.

13. The method of claim 1, further comprising:
    configuring the predetermined condition to be at least one of the request originates from the active node or the request seeks information that is unknown to the standby node.

14. A network element, comprising:
    reception means for receiving an address resolution request from an active node;
    transmit means for transmitting a second request when the request meets a predetermined condition, wherein the predetermined condition comprises at least one of when the request originates from the active node or when the request seeks information that is unknown to the network element;
    update means for updating storage means for storing address resolution information based on information in the request; and
    processor means for assuming responsibilities of the active node when the active node fails.

15. The network element of claim 14, wherein the reception means is configured to receive a broadcast address resolution request.

16. The network element of claim 14, wherein the reception means is configured to receive an address resolution protocol formatted request.

17. The network element of claim 14, wherein the reception means is configured to receive the address resolution request directly from the active node.

18. The network element of claim 14, wherein the reception means is configured to receive a response to the second request.

19. The network element of claim 14, wherein the update means comprises filtering means for filtering the request.

20. The network element of claim 19, wherein the filtering means comprises first comparison means for comparing the request to a filter list containing a set of match rules for at least one of sender network addresses or sender link addresses.

21. The network element of claim 14, wherein the update means comprises second comparison means for comparing information in the response to information in the storage means.

22. The network element of claim 21, wherein the second comparison means comprises identification means for identifying whether the information in the response is already in the storage means.

23. The network element of claim 14, wherein the update means comprises copy means for copying previously unknown information from the response into the storage means.

24. The network element of claim 23, wherein the copy means comprises creation means for creating an entry in a table of the storage means.

25. The network element of claim 23, wherein the copy means comprises mapping means for mapping, in the storage means, a network address in the response to a link address in the response.

26. The network element of claim 14, wherein the processor means is configured to assume the responsibilities of the active node by detecting the failure of the active node and becoming a newly active node.

27. A network element, comprising:
a processor; and
a cache,
wherein the processor is configured to receive an address resolution request from an active node,
wherein the processor is also configured to transmit a second request mirroring the request when the request meets a predetermined condition,
wherein the predetermined condition comprises at least one of when the request originates from the active node or when the request seeks information that is unknown to the network element,
wherein the processor is configured to update the cache based on information in the request, and
wherein the processor is also configured to assume responsibilities of the active node when the active node fails.

28. The network element of claim 27, wherein the processor is configured to receive a broadcast address resolution request.

29. The network element of claim 27, wherein the processor is configured to receive an address resolution protocol formatted request.

30. The network element of claim 27, wherein the processor is configured to receive the address resolution request directly from the active node.

31. The network element of claim 27, wherein the processor comprises a filter configured to filter the request.

32. The network element of claim 31, wherein the filter is configured to compare the request to a filter list containing a set of match rules for at least one of sender network addresses or sender link addresses.

33. The network element of claim 27, wherein the processor is configured to compare information in the response to information in the cache.

34. The network element of claim 33, wherein the processor is configured to compare the information in the response by identifying whether the information in the response is already in the cache.

35. The network element of claim 27, wherein the processor is configured to copy previously unknown information from the response into the cache.

36. The network element of claim 35, wherein the processor is configured to copy the previously unknown information into the cache by creating an entry in a table of the cache.

37. The network element of claim 35, wherein the processor is configured to copy the previously unknown information into the cache by mapping, in the cache, a network address in the response to a link address in the response.

38. The network element of claim 27, wherein the processor is configured to assume the responsibilities of the active node by detecting the failure of the active node and becoming a newly active node.

39. A system, comprising:
an active node;
a plurality of neighbor nodes to the active node; and
a standby node, wherein the standby node is configured to mirror the address resolution requests of the active node, when the address resolution requests of the active node request information about at least one of the neighbor nodes, and the information is not already present in a cache of the standby node.

40. A non-transitory computer-readable medium encoded with a computer program configured to cause a hardware device to perform a method, comprising:
receiving an address resolution request from an active node;
transmitting a second request mirroring the request when the request meets a predetermined condition;
updating an address resolution cache based on information in the request; and
assuming responsibilities of the active node when the active node fails.

* * * * *